United States Patent Office 3,641,033
Patented Feb. 8, 1972

3,641,033
4,4′ - (LOWER-ALKYLENEDITHIO OR DISULFONYL)-BIS-TETRAHALO PYRIDINES AND DERIVATIVES THEREOF
Leonard Levine, Lake Jackson, Tex., assignor to The Dow Chemical Company, Midland, Mich.
No Drawing. Filed Feb. 3, 1969, Ser. No. 796,147
Int. Cl. C07d 31/50
U.S. Cl. 260—294.8 F  10 Claims

ABSTRACT OF THE DISCLOSURE

Substituted bis(halogenated azine) compounds such as 4,4′ - (tetramethylenedithio)bis(2,3,5,6 - tetrachloropyridine) or 2,2′-[sulfonylbis(ethylenesulfinyl)]bis(2,3,5,6-tetrachloropyridine) are prepared from haloazines and alkanedithiols. The compounds are useful as pesticides, particularly for the control of plants, including bacteria, fungi and higher plants.

BACKGROUND OF THE INVENTION

The polyhaloazine starting materials employed as starting materials herein are prepared by known procedures for the halogenation of azines such as pyridine or pyrazine. Such halogenation procedures are typically carried out by direct reaction of an azine with a halogen or by the reaction of an incompletely halogenated azine such as a mono-, di- or trihalopyrazine or a mono-, di-, tri- or tetrahalopyridine with a halogen different from the halogen substituents. A halogenation procedure such as is disclosed in U.S. Pat. No. 2,573,268 can be employed.

SUMMARY OF THE INVENTION

This invention is directed to substituted bis(polyhaloazines) and is particularly directed to substituted bis(polyhaloazines) corresponding to the formula:

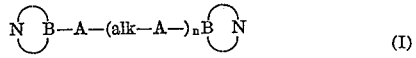  (I)

In the present specification and claims, the expression

represents a polyhaloazine, that is a heterocyclic basic moiety of six ring atoms, of which one or two ring atoms are nitrogen and the remaining four or five ring atoms are carbon, one of which carbon atoms is bonded to a moiety A in the above formula as is indicated by the expression

such basic azine moiety being substituted with from 3 to 4 halogen substituents selected from fluorine, chlorine, iodine and bromine; "alk" represents lower alkylene of from 2, to 3, to 4 carbon atoms; n represents one of the integers 1 and 2; and A represents thio (—S—) or when n is 1, A represents sulfonyl (—SO₂) or when n is 2, A represents sulfinyl (—SO—) in its two occurrences in the moieties

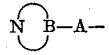

and sulfonyl in its third occurrence. Thus, the compounds of the present invention correspond to the formula:

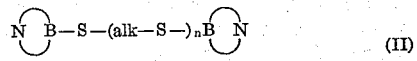  (II)

when A represents thio; to the formula

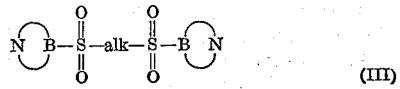  (III)

when n is one and A represents sulfonyl; or to the formula

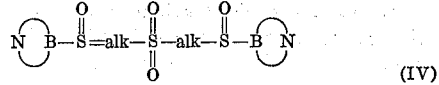  (IV)

when n is two and A represents sulfinyl in the moieties

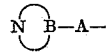

and sulfonyl in its third occurrence. The bis(polyhaloazine) compounds of the invention are crystalline solids which are of varying degrees of solubility in various organic solvents such as benzene, toluene, alcohols, halogenated hydrocarbons and ethers and which are only slightly soluble in water.

The substituted bis(polyhaloazine) compounds of the invention are useful as pesticides for the control of a variety of pests, including in particular bacteria, fungi and higher plants such as Staphylococcus, Candida, Trichophyton and Pullularia species of microorganisms and higher plants such as barnyard grass, pigweed, Japanese millet and spiny clotbur. The compounds wherein A represents sulfonyl or wherein n is 2 and A represents sulfonyl and sulfinyl are much more potent plant growth regulators than those wherein A represents thio, and are therefore preferred for use in controlling higher or lower plant pests. Another preferred group of compounds includes those wherein

represents a polyhaloazine moiety selected from tetrahalo-4-pyridyl and trihalo-2-pyrazinyl. An additional preferred group of compounds are those wherein the halogen is chlorine.

The compounds of the invention wherein A is thio can be prepared by the reaction of an alkali metal salt of an alkanedithiol or a thiodialkanethiol wherein alkaline is of 2, 3 or 4 carbon atoms with a polyhaloazine of one or two nitrogen ring atoms and four or five carbon ring atoms substituted with from two to five halogen substituents. Representative alkali metal salts of alkane dithiols and thiodialkanethiols include the disodium and dipotassium salts of 1,2-ethanedithiol,
1,2-propanedithiol,
1,3-propanedithiol,
1,2-butanedithiol,
1,3-butanedithiol,
1,4-butanedithiol,
thiodiethanethiol,
thiodi-2-propanethiol,
thiodi-3-propanethiol,
thiodi-2-butanethiol,
thiodi-3-butanethiol,
thiodi-4-butanethiol,
2-(2-mercaptoethylthio)propanethiol or
4-(2-mercaptopropylthio)butanethiol.

Representative polyhaloazine starting materials include 2,3,5,6-tetrachloropyridine,
pentachloropyridine, tetrachloropyrazine,
2,3-dibromo-4,5,6-trichloropyridine,
tetrabromopyrazine,
2-bromo-3,5,6-trichloropyrazine,
2-fluoro-3,5,6-trichloropyrazine and
2-iodo-3,5,6-trichloropyrazine.

Preferred polyhaloazine starting materials include the pentahalopyridines and the tetrahalopyrazines. The alkali metal salt starting material can be prepared by known procedures, for example, by mixing an alkanedithiol such as 1,2-ethanedithiol or a thiodialkanethiol such as thiodi-2-propanethiol with an alkali metal hydroxide in an inert organic solvent such as methanol or ethanol for a short period of time at a temperature from about 0° to 25° C.

The reaction of the polyhaloazine with the alkali metal salt starting material proceeds when the reactants are contacted and mixed in an inert organic solvent as a reaction medium. Representative inert organic solvents which can be employed as reaction media include methanol, ethanol, isopropanol, dimethylformamide and dimethylsulfoxide. The reaction proceeds at temperatures of from about 15° to the boiling point of the reaction mixture, and preferably is carried out at temperatures of from about 25° to about 70° C. The exact proportion of the reactants to be employed is not critical; however, the reaction consumes two molar proportions of polyhaloazine reactant for each molar proportion of alkanedithiol or thiodialkanethiol reactant, and the reactants are preferably employed in such proportions, the use of substantially greater amounts of the polyhaloazine being undesirable. The reaction is generally complete in about 4 to 48 hours depending upon the reaction temperature employed.

The reaction proceeds with the evolution of heat and alkali metal halide of reaction. The product precipitates in the reaction mixture with the progress of the reaction when alcoholic reaction media are employed. The product can be separated from the reaction mixture by cooling the reaction mixture followed by filtration to remove the reaction medium. The product can then be separated from materials such as alkali metal halide of reaction, by conventional procedures such as by washing with water or by extraction with organic solvents. The product thus obtained can be purified by recrystallization from organic solvents such as benzene, alcohols, ketones and the like.

In a convenient procedure for the preparation of the substituted bis(polyhaloazine) compounds corresponding to Formula I wherein A is thio, an alkanedithiol or thiodialkanethiol is mixed with a solution of alkali metal hydroxide in ethanol or methanol, and a mixture of an alcohol and a polyhaloazine is mixed portionwise with the resulting solution. Alternately, the alkanedithiol or thiodialkanethiol can be mixed with the polyhaloazine in an alcoholic reaction medium, and alcoholic alkali metal hydroxide can be then added to the mixture. The mixture is then held at a temperature within the reaction temperature range for from 4 to 48 hours. At the end of the reaction period, the reaction mixture is cooled and the solids are separated therefrom by filtration, decantation or the like. The solid residue is triturated with water and the water discarded, or it can be extracted with an organic solvent. The product can be obtained from the extract by evaporation. The product can be purified by conventional procedures such as recrystallization and washing or the product can be converted to a substituted bis(polyhaloazine) corresponding to Formula I when A is sulfonyl or wherein each occurrence of A is independently sulfonyl or sulfinyl.

The compounds of the invention wherein A is sulfonyl or wherein, when n is 2, A is sulfonyl or sulfinyl are prepared by the oxidation of the compounds wherein A is thio. The compounds wherein each occurrence of A is sulfonyl are prepared by the oxidation of a compound of Formula I wherein A is thio and n is 1. The compounds wherein n is 2 and A is sulfinyl in the moieties

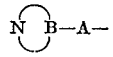

and sulfonyl in its third occurrence are prepared by the oxidation of a compound of Formula I wherein n is 2 and A is thio. The oxidation is carried out in an organic acid as a reaction medium employing an excess of an oxidizing agent, such as perbenzoic acid, nitric acid, chlorine, or preferably a peroxide such as sodium peroxide, potassium peroxide or hydrogen peroxide. Representative organic acids which can be employed include glacial acetic acid, propionic and chloroacetic acid as well as mixtures of such acids. The reaction proceeds when a substituted bis(polyhaloazine) corresponding to Formula I wherein A is thio is dispersed in an organic acid and the solution is mixed with excess oxidizing agent, preferably hydrogen peroxide. The reaction proceeds at temperatures from about 10° to about 95° C. The product can be separated by conventional procedures such as filtration, decantation of centrifugation. The product can be purified by conventional methods such as recrystallization or washing.

In a convenient procedure for preparing the compounds wherein A is sulfonyl or sulfinyl, a substituted bis(polyhaloazine) of the invention wherein A is thio is dispersed in glacial acetic acid and the resulting dispersion is then mixed with an excess of aqueous hydrogen peroxide. Generally, an excess of from about 2 to 20 moles of hydrogen peroxide is employed for each mole of substituted bis(polyhaloazine). The mixture is heated for about ten to thirty hours at a temperature within the reaction temperature range. The product is separated by filtration. The product can be purified by recrystallization or washing.

DESCRIPTION OF THE PREFERRED EMBODIMENTS

The following examples illustrate the invention but are not to be construed as limiting the same.

EXAMPLE 1

Potassium hydroxide (8.4 grams; 0.15 mole) is dissolved in 200 milliliters of methanol and the solution is cooled. Thiodiethanethiol (24 grams; 0.15 mole) is added to the cold solution. The resulting mixture is then added dropwise to a stirred mixture of pentachloropyridine (74.4 grams; 0.3 mole) in 400 milliliters of methanol over a thirty minute period. The temperature of the mixture rises to 35° C. during the addition period. The resulting mixture is stirred for an additional fifteen minutes, after which potassium hydroxide (8.4 grams; 0.15 mole) in 100 milliliters of methanol are added over a fifteen minute period. During this addition, the temperature of the mixture rises to 40° C. The mixture is stirred overnight at a temperature of 40°–45° C., after which the mixture is cooled and filtered. The solid filter cake is triturated with warm water and the resulting solid is dried in a vacuum oven. The resulting solid is recrystallized from a mixture of benzene and methyl ethyl ketone. The recrystallized solid is extracted with boiling propanol, the propanol extract is cooled to precipitate a crystalline solid and the solid is separated by filtration and dried in vacuo. The 4,4' - [thiobis(ethylenethio)]bis(2,3,5,6 - tetrachloropyridine) product is found to melt at 159°–161° C. The product is found by analysis to have sulfur and nitrogen contents of 16.7 and 4.6 percent, respectively, as compared with the theoretical contents of 16.4 and 4.8 percent, respectively, calculated for the named structure. The structure of the product is confirmed by infrared spectroscopy and nuclear magnetic resonance spectroscopy.

EXAMPLE 2

4,4'-[thiobis(ethylenethio)]bis(2,3,5,6 - tetrachloropyridine) prepared as described above in Example 1 (4 grams; 0.007 mole) is mixed with a mixture of 125 milliliters of glacial acetic acid and 25 milliliters of an aqueous solution containing 30 percent hydrogen peroxide by weight. The mixture is stirred at a temperature of 30°–35° C. overnight and is then stirred for about six hours at a temperature of 55–60° C. A precipitate forms during the reaction period. The mixture is filtered and the filter cake is washed with acetic acid and dried in vacuo. The 4,4' - [sulfonylbis(ethylenesulfinyl)]bis(2,3,5,6 - tetrachloropyridine) product is found to melt at a temperature of 165°–167° C. The product is found by analysis to have chlorine, sulfur and nitrogen contents of 43.5, 14.6 and 4.3 percent, respectively, as compared with the theoretical contents of 43.8, 14.8 and 4.3 percent, respectively, calculated for the named structure.

EXAMPLE 3

Potassium hydroxide (18.8 grams; 0.335 mole) is dissolved in 200 milliliters of methanol and the solution is cooled to a temperature of about 5°–15° C. 1,2-ethanedithiol (34 grams; 0.36 mole) is added to the cold solution. The resulting solution is then added dropwise to a stirred slurry of pentachloropyridine (84.5 grams; 0.335 mole) in 300 milliliters of cold methanol over a ninety minute period. The temperature of the mixture is maintained at about 5°–10° C. in an ice bath during the addition period. The resulting mixture is stirred overnight at ambient temperature, after which the mixture is stirred for five hours and heated at a temperature of 40°–45° C. The mixture is cooled to room temperature and filtered. The solid filter cake is triturated with 500 milliliters of boiling benzene and the benzene extract is filtered, then allowed to cool. A solid crystallizes in the benzene extract on cooling to room temperature. The solid is separated by filtration and dried in vacuo. The 4,4'-(ethylenedithio)bis(2,3,5,6-tetrachloropyridine) product is found to melt at 244°–248° C. with sublimation. The product is found by analysis to have sulfur and nitrogen contents of 12.3 and 5.1 percent, respectively, as compared with the theoretical contents of 12.2 and 5.3 percent, respectively, calculated for the named structure. The structure of the product is confirmed by infrared spectroscopy and nuclear magnetic resonance spectroscopy.

In substantially the same procedure, two molar proportions of potassium hydroxide, one molar proportion of 1,2-propanedithiol and two molar proportions of pentachloropyridine are reacted together to prepare 4,4'-(1,2-propylenedithio)bis(2,3,5,6 - tetrachloropyridine), melting at 136°–139° C.

In a similar procedure, 4,4'-(1,2-butylenedithio)bis(2,3,5,6-tetrabromopyridine), having a molecular weight of 908, is prepared by the reaction of 1,2-butanedithiol, sodium hydroxide and pentabromopyridine.

In a similar procedure, potassium hydroxide, 2-(2-mercaptoethylthio)propanethiol and 2-bromo-3,4,5,6-tetrachloropyridine are reacted together to prepare 4-[2-[2-(2-bromo-3,5,6-trichloro - 4 - pyridylthio)ethylthio]propylthio]-2-bromo-3,5,6-trichloropyridine, having a molecular weight of 687.

EXAMPLE 4

Sodium hydroxide (7.8 grams; 0.194 mole) is dissolved in 75 milliliters of methanol and the solution is cooled. 1,4-butanedithiol (11.8 grams; 0.097 mole) is dissolved in 50 milliliters of methanol and the resulting mixture is added to the cold solution. The resulting solution containing the disodium salt of 1,4-butanedithiol is then added dropwise to a stirred slurry of pentachloropyridine (49 grams; 0.195 mole) in 500 milliliters of methanol. The addition is carried out over a thirty minute period at a temperature of 15°–20° C. The mixture is stirred overnight at a temperature of 35–45° C., after which the mixture is cooled and filtered. The solid filter cake is dried in a vacuum oven and then triturated with boiling toluene. The toluene extract is cooled to precipitate a crystalline solid and the solid is separated by filtration and dried in vacuo. The 4,4'-(tetramethylenedithio)bis(2,3,5,6-tetrachloropyridine) product is recrystallized from acetic anhydride and found to melt at 210°–213° C. The structure of the product is confirmed by infrared spectroscopy and nuclear magnetic resonance spectroscopy.

EXAMPLE 5

4,4' - (1,2 - propylenedithio)bis(2,3,5,6-tetrachloropyridine) prepared as described in Example 3 (1 gram) is mixed with a mixture of 35 milliliters of glacial acetic acid and 6 milliliters of an aqueous solution containing 30 percent hydrogen peroxide by weight. The mixture is stirred overnight at a temperature of 70°–80° C. The mixture is cooled and 6 milliliters of an aqueous solution containing 30 percent hydrogen peroxide by weight is added and the mixture is heated at a temperature of 60°–70° C. for several hours. The mixture is cooled and filtered. The filter cake is washed with acetic acid and water and dried in a vacuum oven. The 4,4'-(1,2-propylenedisulfonyl)bis(2,3,5,6-tetrachloropyridine) product is found to melt at a temperature of 215°–217° C. The product is found by analysis to have sulfur and nitrogen contents of 10.6 and 4.57 percent, respectively, as compared with the theoretical contents of 10.6 and 4.65 percent, respectively, calculated for the named structure. The structure of the product is confirmed by infrared spectroscopy.

EXAMPLE 6

4,4' - (tetramethylenedithio)bis(2,3,5,6 - tetrachloropyridine) prepared as described above in Example 4 (2.5 grams; 0.0045 mole) is mixed with a mixture of 75 milliliters of glacial acetic acid and 5 milliliters of an aqueous solution containing 30 percent hydrogen peroxide by weight (0.044 mole). The mixture is stirred at a temperature of 55°–65° C. overnight and is then held for about forty-eight hours at room temperature. Four milliliters of aqueous 30 percent hydrogen peroxide are then added, and the mixture is stirred and heated at 45°–55° C. for three hours. The mixture is cooled in an ice bath and filtered. The filter cake is washed with acetic acid and dried in vacuo. The 4,4'-(tetramethylenedisulfonyl)bis(2,3,5,6-tetrachloropyridine) product is found to melt at a temperature of 237°–241° C. The product is found by analysis to have chlorine and nitrogen contents of 46.5 and 4.4 percent, respectively, as compared with the theoretical contents of 46.1 and 4.5 percent, respectively, calculated for the named structure. The structure of the product is confirmed by infrared and nuclear magnetic resonance spectroscopy.

In substantially the same procedure, the following are prepared:

2,2' - (ethylenedisulfonyl)bis(3,5,6-trichloropyrazine), having a molecular weight of 521, is prepared by the oxidation of 2,2'-(ethylenedithio)bis(3,5,6-trichloropyrazine) in the above procedure.

4,4' - (1,2-propylenedisulfonyl)bis(2,3,5,6-tetrabromopyridine), having a molecular weight of 958, is prepared by the oxidation of 4,4'-(1,2-propylenedithio)bis(2,3,5,6-tetrabromopyridine).

EXAMPLE 7

Sodium hydroxide (13.9 grams; 0.346 mole) is dissolved in 300 milliliters of ethanol and the solution is cooled. The resulting cold solution is then added dropwise to a stirred mixture of 1,4-butanedithiol (21.1 grams; 0.173 mole), tetrachloropyrazine (75.4 grams; 0.346 mole) and 300 milliliters of ethanol over a three hour period. The temperature of the mixture remains at about 25°–35° C. during the addition period. The resulting mixture is stirred for about six hours and then held overnight at ambient temperature, during which time a precipitate forms. The mixture is then cooled and filtered. The solid filter cake is recrystallized from boiling propanol and the 2,2'-(tetramethylenedithio)bis(3,5,6-trichloropyrazine) product is found to melt at 97°–99° C. The product is found by analysis to have sulfur and nitrogen contents of 12.8 and 11.4 percent, respectively, as compared with the theoretical contents of 13.2 and 11.6 percent, respectively, calculated for the named structure. The structure of the product is confirmed by infrared spectroscopy and nuclear magnetic resonance spectroscopy.

EXAMPLE 8

2,2'-(tetramethylenedithio)bis(3,5,6-trichloropyrazine) prepared as described above in Example 7 (2 grams; 0.0041 mole) is mixed with 52 milliliters of glacial acetic acid. Two grams of an aqueous solution containing 30 percent hydrogen peroxide by weight is added portionwise to the mixture with stirring. The mixture is stirred at a temperature of 25°–33° C. for three hours. One gram of aqueous 30 percent hydrogen peroxide is then added and the mixture is stirred overnight at a temperature of 30°–35° C. The mixture is evaporated in vacuo. The 2,2'-(tetramethylenedisulfonyl)-bis(3,5,6-trichloropyrazine) product is recrystallized from propanol and found to melt at a temperature of 151°–155° C. The structure of the product is confirmed by elemental analysis and by infrared spectroscopy.

The substituted bis(polyhaloazines) of the invention are employed in pesticides, and particularly as the active ingredients in compositions to be employed for controlling the growth of various higher plants and of microorganisms. They can also be employed as selective herbicides.

For such uses, the compounds can be employed in an unmodified form or dispersed on finely divided inert solids and employed as dusts. The compounds can also be dispersed in water with or without the aid of a surface active dispersing agent and the resulting aqueous suspensions or emulsions can be employed as drenches or sprays. In other procedures, the products are employed as active constituents in solvent solutions, oil-in-water and water-in-oil emulsions or aqueous dispersions. The augmented compositions are adapted to be formulated as concentrates and subsequently diluted with additional liquid or solid adjuvants to produce the ultimate treating compositions.

In representative operations, substantially complete defoliation and control of bean plants is obtained when an aqueous composition containing 0.5 percent by weight of 4,4'-[sulfonylbis(ethylenesulfinyl)]bis(2,3,5,6-tetrachloropyridine), as the sole active agent therein, is applied to growing bean plants as a spray.

In another representative operation, complete control and inhibition of *Bacillus subtilis, Staphylococcus aureus, Trichophyton mentagrophytes, Candida albicans, Cephaloascus fragrans* and *Pullularia pullulans* is obtained when 2,2'-(tetramethylenedisulfonyl)bis(3,5,6-trichloropyrazine) is dispersed in nutrient agar at a concentration of 500 parts by weight of substituted compound per million parts by weight of ultimate composition, and the agar is then inoculated with viable organisms of the above-named species and incubated under conditions conducive to micro-organism growth. In other operations, complete controls and kills of ram's horn snail are obtained when 4,4'-(ethylenedithio)bis(2,3,5,6-tetrachloropyridine) is dispersed in the snails' aqueous environment at a concentration of 5000 parts per million.

What is claimed is:

1. A compound corresponding to the formula

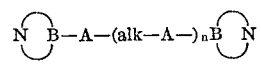

wherein

represents 2,3,5,6-tetrahalo-4-pyridyl in which halo is selected from the group consisting of fluorine, chlorine, iodine and bromine; alk independently represents lower alkylene of from two to four carbon atoms, inclusive, $n$ represents one of the integers one and two; A represents thio or sulfonyl when $n$ is one, and A represents thio or A independently represents sulfinyl in two occurrences in

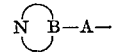

and sulfonyl in the third occurrence thereof when $n$ is two.

2. A compound of claim 1 wherein A is thio.
3. A compound of claim 1 wherein A is sulfonyl and $n$ is one.
4. A compound of claim 1 wherein $n$ is one.
5. A compound of claim 4 wherein

is 2,3,5,6-tetrachloro-4-pyridyl.

6. A compound of claim 4 wherein alk is tetramethylene.
7. A compound of claim 1 wherein alk is ethylene.
8. A compound of claim 7 wherein $n$ is two and A represents sulfinyl in the two occurrences thereof in

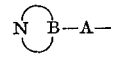

and sulfonyl in the third occurrence thereof.

9. A compound of claim 8 wherein

represents 2,3,5,6-tetrahalo-4-pyridyl.

10. A compound of claim 1 wherein alk is propylene.

References Cited

UNITED STATES PATENTS 3,415,832   12/1968   Crawford _____ 260—294.8 F
3,475,441   10/1969   Levine _____ 260—294.8 F ALAN L. ROTMAN, Primary Examiner U.S. Cl. X.R.

260—250 A, 294.8 G, 999; 71—92, 94